May 15, 1962  W. D. MAYNARD  3,035,128
MULTIPLE CONTACT DEVICES
Filed July 25, 1960  4 Sheets-Sheet 1

CONTACT POSITIONS FOR DIFFERENT COMMUTATOR POSITIONS

*INVENTOR.*
W. D. MAYNARD
BY
*Forest B. Hitchcock*
HIS ATTORNEY

May 15, 1962   W. D. MAYNARD   3,035,128
MULTIPLE CONTACT DEVICES
Filed July 25, 1960   4 Sheets-Sheet 2

*INVENTOR.*
W. D. MAYNARD
BY
Forest B. Whitlock
HIS ATTORNEY

May 15, 1962   W. D. MAYNARD   3,035,128
MULTIPLE CONTACT DEVICES
Filed July 25, 1960   4 Sheets-Sheet 3

*INVENTOR.*
W. D. MAYNARD
BY
*Forest B. Hitchcock*
HIS ATTORNEY

May 15, 1962 W. D. MAYNARD 3,035,128
MULTIPLE CONTACT DEVICES
Filed July 25, 1960 4 Sheets-Sheet 4

INVENTOR.
W.D. MAYNARD
BY
Forest B. Hitchcock
HIS ATTORNEY

United States Patent Office 3,035,128
Patented May 15, 1962

3,035,128
MULTIPLE CONTACT DEVICES
Wheeler D. Maynard, Mendon, N.Y., assignor to General Railway Signal Company, Rochester, N.Y.
Filed July 25, 1960, Ser. No. 44,989
11 Claims. (Cl. 200—24)

This invention relates to multiple contact devices and more particularly relates to contact devices wherein the contact segments and associated wiring are of the printed circuit type and cooperate with contact brushes to make and break circuits in accordance with the movement of one or the other of the elements.

This application is a continuation-in-part of my prior application Ser. No. 763,569, filed September 26, 1958.

In general, the present invention contemplates a contact device wherein one of the contact carrying elements is mounted stationary whereas the other contact carrying element is mounted for rotary movement and is spring biased against the stationary element.

The physical contact between the two electrical contact carrying elements comprises a three point contact means which provides a spring biased floating movable contact element which bears against the stationary contact element evenly at all times regardless of the position of the contact elements.

Such a structure also provides a contact assembly which is free of adjustment and one which may be initially regulated to provide the proper amount of contact pressure, thus eliminating excessive wear on the contact elements due to excessive contact pressure.

The contact device of the present invention also lends itself to miniature construction composed of parts made from plastic "Nylon," molded "Cycolac" or the like material which provides lightness in weight as well as long wear life.

More specifically, one form of the present invention provides a multiple contact device which may be rotated to any one of several positions each of which provides a different contact combination. Such a device is particularly adaptable to operation in response to selected codes and may be operable through a rotatably mounted shaft by manual means, stepping devices, or motor operated gearing such as disclosed in the parent application Ser. No. 763,569 above mentioned.

In structure, this first form of the present invention comprises a stationary contact element having six contact brushes mounted thereon and spaced in such a manner that three of the contact brushes bear against one disc of a rotatably mounted double disc commutator whereas the other three contact brushes bear against the other disc of the double disc commutator. This double disc commutator is constructed and mounted so that one disc lies within the contour of the other concentrically on the same plane and on the same driving drum, so that they may be rotated as one unit by the shaft.

Each commutator disc is made of insulation material and is provided with metallic contact segments bonded thereon which cooperate with their respective three contact brushes. Also, each commutator disc is separately positioned by and driven by the driving drum, and is floatably mounted on a coil spring which biases it against its respective three contact brushes, thus providing a three point bearing means for each individual commutator disc.

Another form of the invention provides a multiple contact device having several pairs of stationary contacts and a movable contact brush for each pair of stationary contacts. This particular type of device is particularly adaptable to and simulates conventional two position polar relay operation whereby the operation of the relay armature oscillates each particular movable contact brush from one contact to the other of its associated pair of stationary contacts.

In structure, this second form of the present invention comprises a stationary contact element in the form of an insulation board having contact segments and associated wiring bonded thereon, and rotatably mounted contact elements which bear against the stationary contact element under spring bias.

The rotatable contact elements comprise two similar shaped discs of insulation material which are interleaved with each other and mounted on and driven by a common driving drum. Each disc is provided with three contact brushes and is floatably mounted on coil springs which bias it against the stationary contact element, thus providing a three point bearing means for each individual contact carrying disc.

The electromagnetic operating means for oscillating the movable contact elements in this second form of the present invention may assume any one of several forms well-known in the art and two different types have been shown for the purpose of illustration.

One such type of electromagnetic operating means shown comprises a conventional two position polar structure of the tractive armature type which is capable of being energized to either one of two positions. A lever arm rigidly attached at one end to the armature and operatively connected at its other end to the driving drum provides the means for oscillating the movable contact elements.

The other such type of electromagnetic operating means shown comprises a polar structure of the rotary type which may be poled in two different directions by reversal of the polarity and employs a permanent magnet armature which is attracted in one direction or the other in accordance with the polarity of the core structure. Suitable stops limit the movement of the armature in either direction so that the desired amount of oscillating movement is provided.

Other objects, purposes and characteristic features of the present invention will be apparent and pointed out as the detailed description progresses with reference to the accompanying drawings. In the drawings, like reference characters refer to like parts in the various views, in which.

Figure 7:
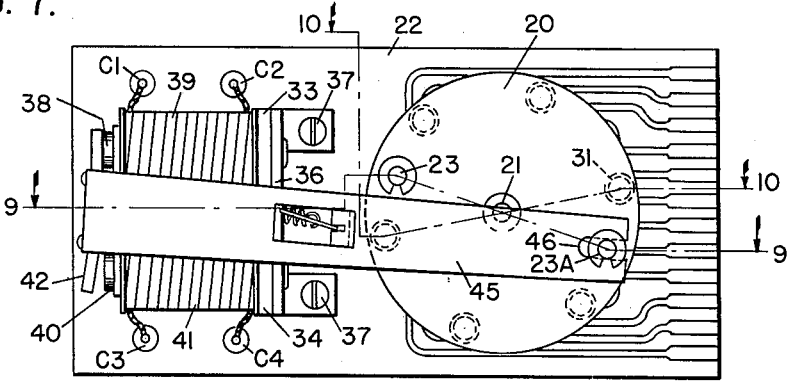
FIG. 7 is a front view of the multiple contact device of a second form of the present invention illustrated as having an electromagnetic operating means of the two position polar tractive armature type.
Figure 8:
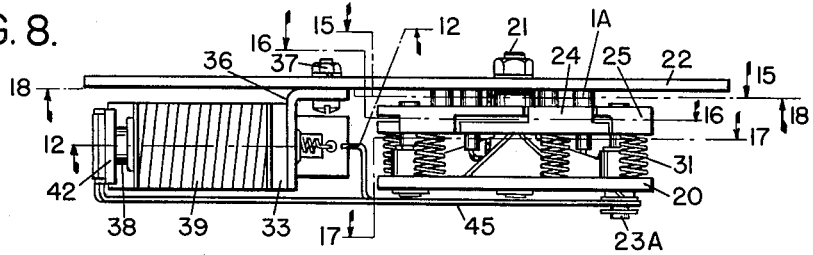
FIG. 8 is a top view of the multiple contact device apparatus shown in FIG. 7.
Figure 15:
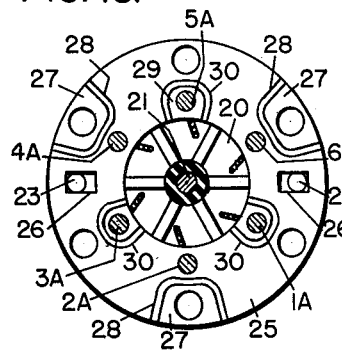
Figure 16:
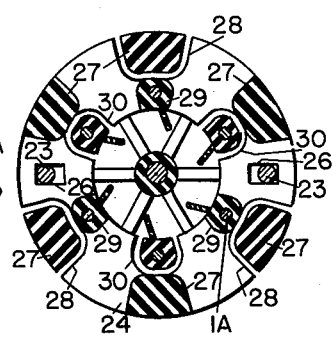
Figure 17:
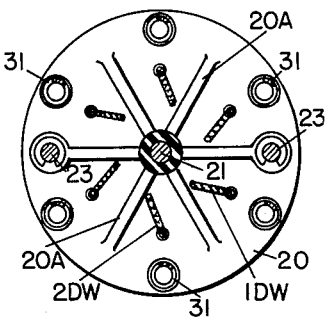
Figure 18:
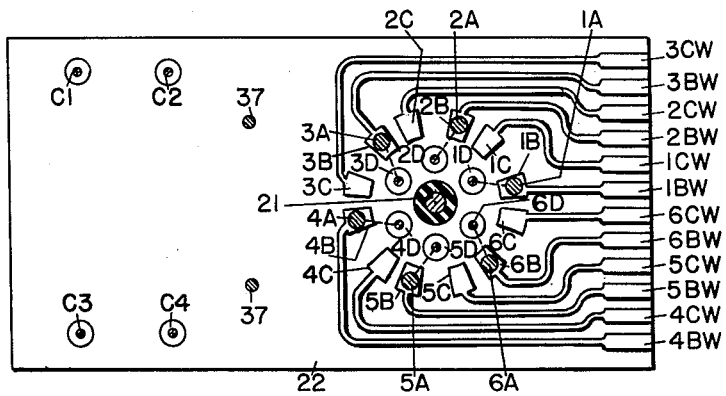
Figure 19:
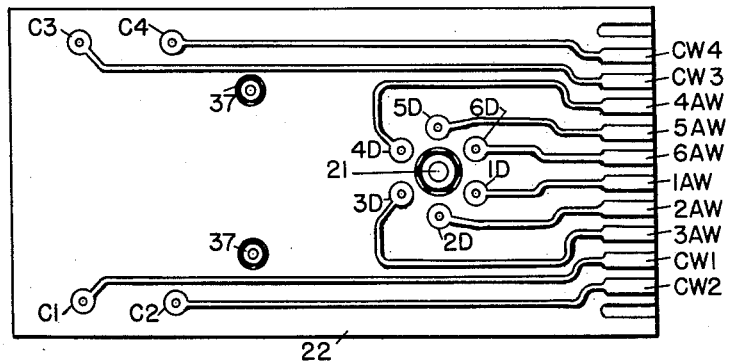
Figure 20:
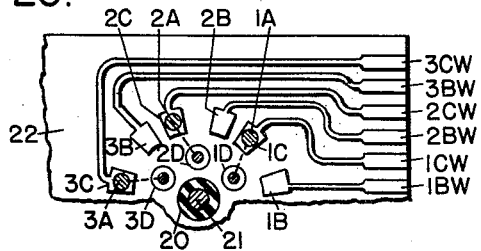
Figure 21:
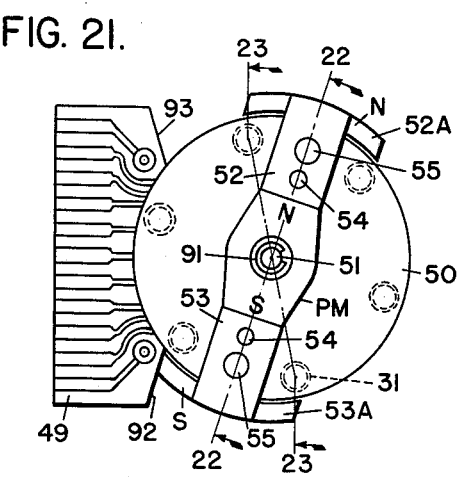
Figure 22:
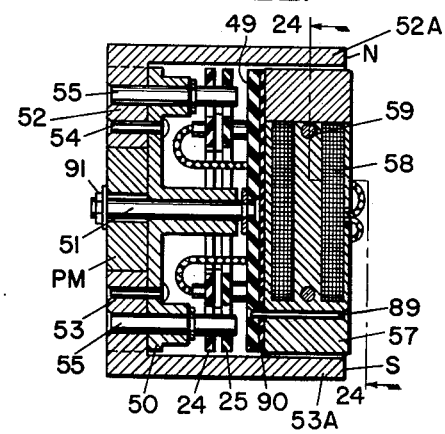
Figure 23:
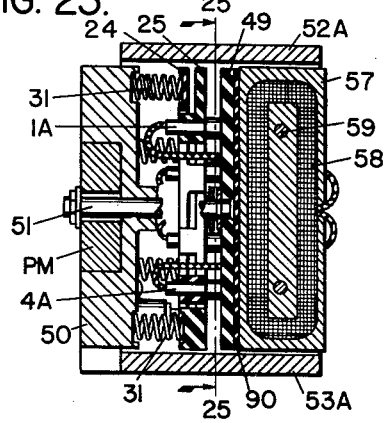
Figure 24:
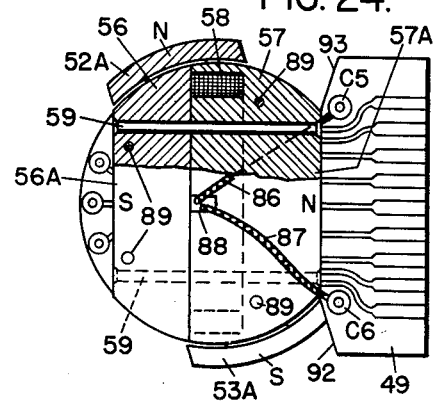
Figure 25:
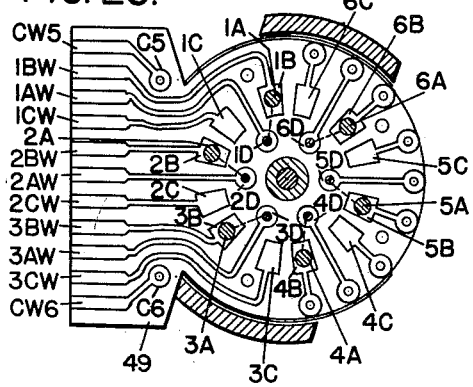
Figure 26:
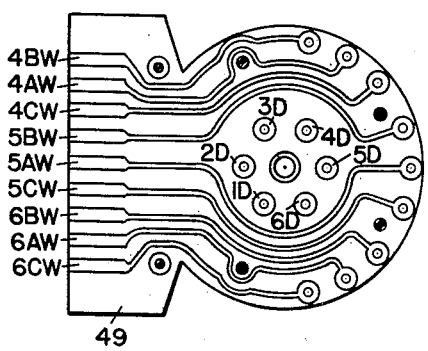

FIG. 15, 16 and 17 are sectional plan view of the multiple contact device part of the apparatus shown in FIGS. 7 and 8 and were taken substantially on the lines 15—15, 16—16, and 17—17 of FIG. 8 looking in the direction of the arrows;

FIG. 18 is a plan view of the contact side of the printed circuit board of the multiple contact device shown partly in section as taken on the line 18—18 of FIG. 8 looking in the direction of the arrows;

FIG. 19 is a plan view of the outside of the printed circuit board shown in FIG. 18;

FIG. 20 is a partial plan view of the contact side of the printed circuit board similar to FIG. 18 and shows the movable contact members operated to their other positions;

FIG. 21 is a plan view of the multiple contact device of the second form of the present invention illustrated as having an electromagnetic operating means of the two position polar rotary type;

FIG. 22 is a sectional view of the apparatus shown in FIG. 21 as taken on the line 22—22 of FIG. 21 looking in the direction of the arrows;

FIG. 23 is a sectional view of the apparatus shown in FIG. 21 as taken on the line 23—23 of FIG. 21 looking in the direction of the arrows;

FIG. 24 is a partial sectional plan view of the electromagnetic part of the apparatus shown in FIGS. 21 and 22 as taken on the line 24—24 of FIG. 22 looking in the direction of the arrows;

FIG. 25 is a plan view of the contact side of the printed circuit board of the multiple contact device shown partly in section as taken on the line 25—25 of FIG. 23 looking in the direction of the arrows; and FIG. 26 is a plan view of the outside of the printed circuit board shown in FIG. 25.

Referring now to the detailed drawings, FIGS. 1 to 6 inclusive illustrate one form which the multiple contact device of the present invention can assume. The multiple contact device has been shown as mounted in a simple two piece casing having a base portion 60 and a cover portion 61 which telescope each other and are fastened together by means of screws 62. The stationary contact element of the multiple contact device is in form of a printed circuit terminal board 65 of insulation material having printed circuits and contact brushes bonded thereon or otherwise attached thereto and is mounted within the cover portion of the casing by means of screws 63. The movable contact element of the multiple contact device is in the form of a double disc commutator C of insulation material having metallic contact segments bonded thereon and is rotatably mounted on a driving drum 64 within the base portion 60 of the casing.

Figure 1:
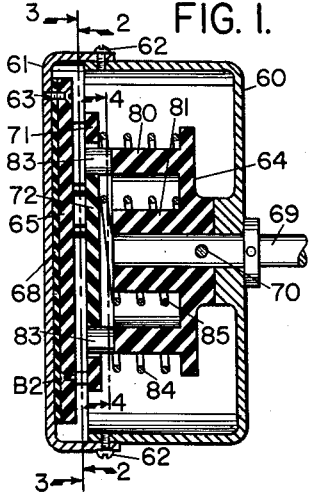
FIG. 1 is a cross sectional view of the multiple contact device of one form of the present invention taken substantially through the center as would be indicated by the lines 1—1 of FIGS. 2 and 3.
Figure 2:
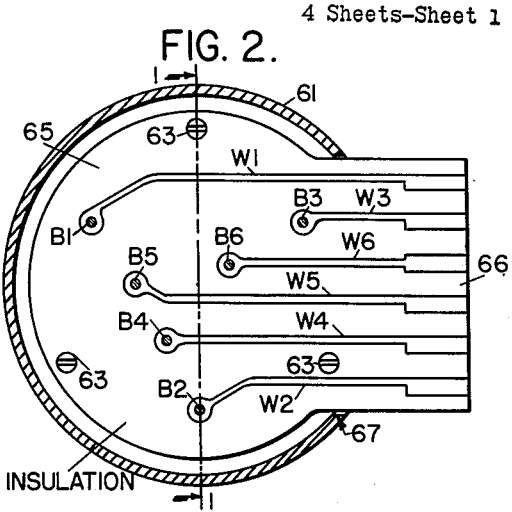
FIG. 2 is a sectional plan view taken on the line 2—2 of FIG. 1 as viewed in the direction of the arrows and shows the face portion of the stationary contact element which carries the six contact brushes thereon.

The terminal board 65 of the stationary contact element is shaped to fit the contour of the casing cover 61 and has one end 66 reduced in size where it extends through an opening 67 in the casing cover 61. The terminal board 65 is provided with six metallic contact pads bonded thereon, each having a metallic contact brush extending therethrough and on through the terminal board proper as shown in FIGS. 1 and 2. These contact brushes, which have been designated B1 to B6 inclusive, each have an enlarged head portion which extends outward away from the terminal board 65 and a reduced base portion which extends through a hole in the terminal board 65 wherein it is riveted over to provide a fastening means, such as is shown in connection with the contact brush B2 in FIG. 1.

Extending from each contact pad and brush combination B1 to B6 inclusive to the outer end 66 of the terminal board 65 is a printed circuit wire, which wires have been designated W1 to W6 respectively. These wires carry current to and from the contact brushes B1 to B6 inclusive and terminate into enlarged pads at the outer end 66 of the terminal board 65 to facilitate making up plug connections or other type of wiring connections to external sources. In assembly, a sheet of insulating material 68 is inserted between the casing cover 61 and the back side of the terminal board 65 to electrically insulate the contact brushes B1 to B6 inclusive from the casing cover 61.

Figure 3:
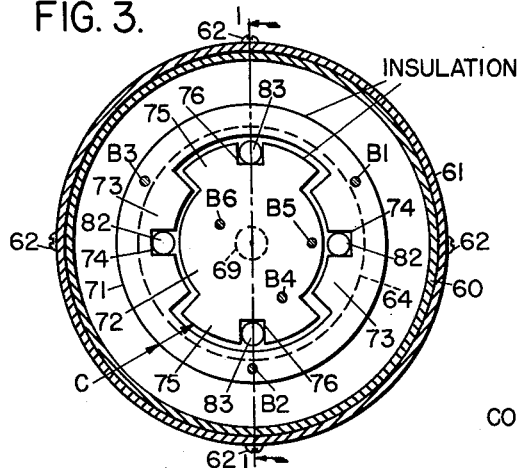
FIG. 3 is a sectional plan view taken on the line 3—3 of FIG. 1 as viewed in the direction of the arrows and shows the face portion of the movable contact elements and the manner in which they are mounted one within the other. The contact segments bonded thereon have been eliminated to more clearly distinguish the outlines of the two separate contact element discs.
Figure 4:
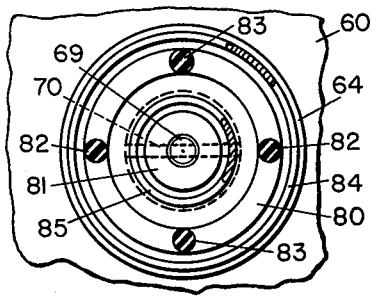
FIG. 4 is a sectional plan view taken on the line 4—4 of FIG. 1 as viewed in the direction of the arrows and shows the driving drum and the movable contact element biasing springs mounted thereon.
Figure 5:
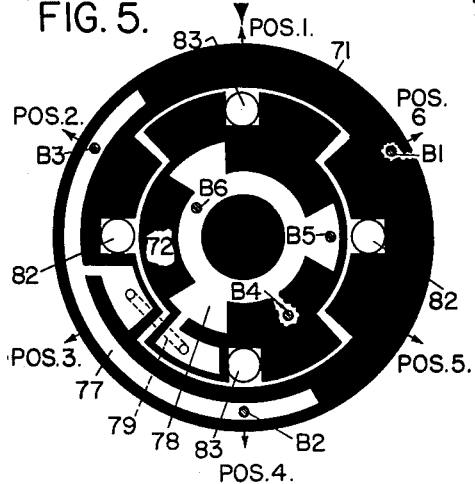
FIG. 5 is an enlarged plan view of the face portion of the movable contact elements shown in FIG. 3 and clearly shows the contact segments against the black background of the commutator discs which are of insulating material. Also shown superimposed thereon are the six stationary contact brushes associated therewith.

The double disc commutator C of the movable contact element and the mounting means therefor has been shown in detail in FIGS. 3, 4 and 5. The commutator C has been shown mounted on the driving drum 64 which in turn is mounted on a shaft 69 and pinned thereto by means of a cross pin 70. The shaft 69 extends through the base portion 60 of the casing and is subject to rotation by means described hereinafter. The commutator C primarily includes two flat discs 71 and 72 of insulation material which are positioned one within the other concentrically and on the same plane. Although these discs 71 and 72 are provided with metallic contact segments as shown in FIG. 5, these contact segments have been eliminated in the showing of FIG. 3 to more clearly show the contours of the discs 71 and 72 and the manner in which they interlock.

The outer disc 71 is provided with two diametrically opposite inwardly projecting portions 73 which each have a notch 74 therein located on a line through their centers. Likewise, the inner disc 72 is provided with two diametrically opposite outwardly projecting portions 75 which each have a notch 76 therein located on a line through their centers. Although these projecting portions on the two discs 71 and 72 interlock with each other, they do not touch each other and this structural detail has no effect on the concentric mounting arrangement. The notches 74 and 76 determine the concentric alignment of the two discs, as about to be explained.

The driving drum 64 has an outer hub or circular wall 80 and an inner hub 81 extending outwardly therefrom on its front surface. The outer hub 80 has four circular pins or studs extending outwardly from its end surface and these pins are spaced ninety degrees apart. This outer hub 80 and its four associated pins are so spaced and sized that the flat commutator discs 71 and 72, when placed thereover, permits the projecting portions 73 and 75 to rest on the end surface of the hub 80 with the four pins extending through the four notches in the two discs 71 and 72. Thus, it can be seen that two of the pins designated 82 cooperate with two notches 74 in the outer disc 71 whereas the other two pins designated 83 cooperate with the two notches 76 in the inner disc 72. This arrangement not only mounts the discs 71 and 72 concentrically on the driving drum 64, but the two pins 82 act as driving members for the commutator disc 71 whereas the two pins 83 act as driving members for the commutator disc 72.

When the commutator discs 71 and 72 and the driving drum 64 are in their assembled position as just described and shown in FIGS. 3 and 4, provision is made to bias the commutator discs 71 and 72 outward away from the back of the driving drum 64 so that the outer sides of the discs 71 and 72 which carry the contact segments will bear against their associated contact brushes B1 to B6 inclusive located on the terminal board 65 as previously described. A coil spring 84 surrounding the outer hub 80 and located between the outer disc 71 and the back of the driving drum 64 provides the necessary bias for the outer disc 71 whereas a coil spring 85 surrounding the inner hub 81 provides the necessary bias for the inner disc 72.

As previously mentioned, the terminal board 65 is provided with six contact brushes B1 to B6 inclusive for cooperation with the commutator C. It should now be noted, however, that these contact brushes are so arranged and spaced that the outer disc 71 in its biased position bears against only three brushes, namely, brushes B1, B2 and B3. Similarly, the inner disc 72 in its biased position bears against only three brushes, namely, brushes B4, B5 and B6. This is shown very distinctly in FIGS. 3 and 5 wherein the brushes B1 to B6 inclusive are superimposed and shown in cross section on the contact segment side of the commutator discs 71 and 72.

Referring now to FIG. 5, the commutator C of FIG. 3 has been shown in enlarged size to more clearly show the metallic contact segments which are bonded thereon. As the two commutator discs 71 and 72 are of insulation material they have been shown in solid block whereas the metallic contact segments 77 and 78 are shown clear. The six stationary contact brushes B1 to B6 inclusive have been shown in cross section as superimposed thereon. Also, the four drive pins 82 and 83 of the driving drum 64 are shown cooperating with their respective notches 74 and 76 of the commutator discs 71 and 72.

The contact segment 77 is located entirely on the outer disc 71 whereas the contact segment 78 is located entirely on the inner disc 72. A flexible wire connector 79 provides an electrical connection between the two contact segments 77 and 78. It can now be seen that when the commutator C is rotated, the contacts brush B6 is always in contact with the contact segment 78 whereas the other five contact brushes B1 to B5 inclusive at times bear against their respective contact segments 77 and 78 and at other times bear against the insulation part of the commutator C.

As previously mentioned, this multiple contact device is assembled and operated to have its commutator C rotated to any one of six different stop positions as indicated by the markers Pos. 1 to Pos. 6 inclusive on FIG. 5. Consequently, six different combinations of circuits can be made up as the commutator is rotated through one complete revolution. As the contact brush B6 is always made up with the contact segments 77 and 78, they being connected together by means of the flexible wire 79, the contact brush B6 acts as a common return in all six circuits.

Figure 6:
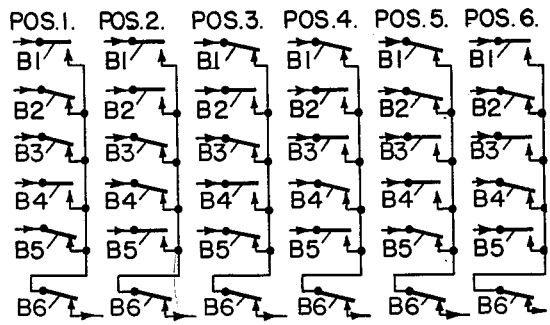
FIG. 6 is a schematic view showing the open and closed positions of the various contact segments and contact brushes as simulated by open and closed contact fingers for the six positions which the contact elements can assume.

The six different circuit combinations have been illustrated diagrammatically in FIG. 6, wherein there has been shown an illustration of open and closed contact fingers to simulate the open and closed positions of the contact segments 77 and 78 and their respective contact brushes B1 to B6 in all six stop positions of the commutator C. For example, the commutator C of FIG. 5 has been shown in its Pos. 1 and by reference to Pos. 1 in the table of FIG. 6 we find that the circuit through the contact B1 is open to the common return brush B6. This is true because by referring again to FIG. 5 we see that contact brush B1 is resting on insulation and hence there is no closed circuit to contact brush B6. Similarly, in FIG. 5, contact brush B2 is resting on contact segment 77 thus establishing a circuit and we find that by observing contact B2 in Pos. 1, FIG. 6 that the circuit through the contact B2 is closed to the common return brush B6. Thus, the open and closed contacts in the six columns in FIG. 6 simulate the open and closed circuits through the commutator C in all six of its positions.

With reference now to the operation of the form of multiple contact device shown in FIGS. 1 to 6 inclusive and described above, as previously mentioned, rotation of the commutator C is caused by rotary movement of the shaft 69. The shaft may be rotated in any of several well-known manners in accordance with the usage of the multiple contact device. For example, when used merely for selecting individual operating circuits, the shaft may be rotated manually by means of a knob fastened thereto so that it may be turned to any one of its six positions. Such a type of device may also have its shaft rotated by means of gearing and an electrically operated stepping mechanism. This multiple contact device may also be used for operation of data posting indicators and the like such as disclosed in the parent application Ser. No. 763,569 above mentioned wherein codes received over the wires W1 to W5 inclusive cause motor operation of the commutator to certain designated positions.

Referring now to FIGS. 7 to 20 inclusive of the drawings, there has been shown another form which the multiple contact device of the present invention can assume. The multiple contact device has been shown mounted on a terminal board along with an electromagnetic operating device to form a relay of the polar tractive armature type which operates its movable contacts back and forth between respective stationary contacts. Basically, this form of multiple contact device employs the same principle of three point bearing means for the spring biased movable contact elements as that shown and described in connection with the first form of multiple contact device. Principally, the main point of difference lies in the fact that the stationary printed circuit terminal board contains the contact segments and the movable interleaved discs carry the contact brushes. Also, in operation, each movable contact brush is merely oscillated back and forth between its associated two contact segments to simulate regular front and back contact operation of a conventional relay.

Figure 9:
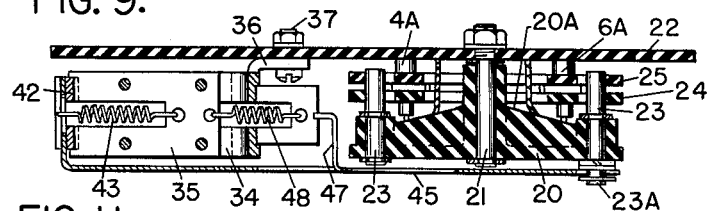
FIG. 9 is a sectional view of the multiple contact device apparatus shown in FIG. 7 as taken substantially on the line 9—9 of FIG. 7 looking in the direction of the arrows.
Figure 11:
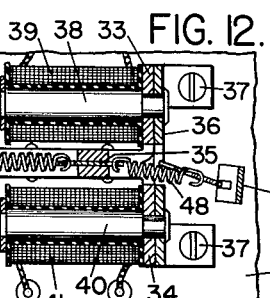
FIG. 11 is an end view of the electromagnetic part of the apparatus shown in FIG. 7.
Figure 12:
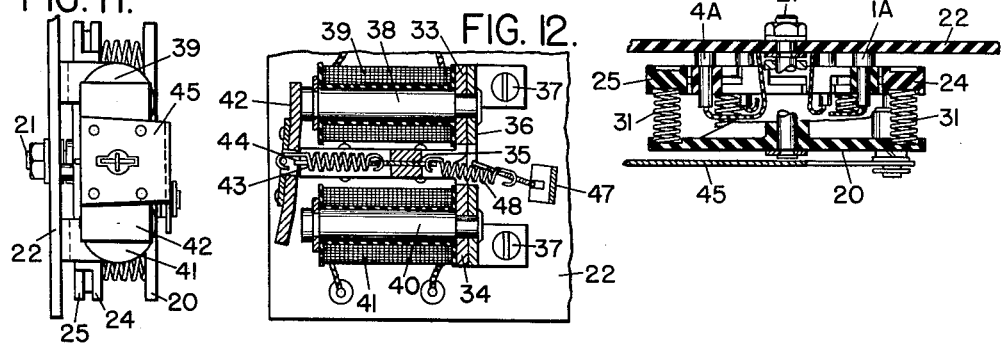
FIG. 12 is a sectional front view of the electromagnetic part of the apparatus shown in FIGS. 7 and 8 substantially as viewed on the line 12—12 of FIG. 8 looking in the direction of the arrows.

With reference to the structure of this form of multiple contact device, as shown in FIG. 9, the driving drum 20 is rotatably mounted on a shaft pin 21 which is suitably fastened into the stationary terminal board 22. This driving drum 20 is provided with two drive pins 23 which are mounted diametrically opposite to each other near the periphery of the drum. These drive pins 23 extend inwardly towards the terminal board 22 and serve to both position and drive the two contact carrying discs 24 and 25. Each of the contact carrying discs 24 and 25 is provided with two rectangular shaped openings 26 located near its periphery and diametrically opposite to each other, which openings receive the drive pins 23 (see FIGS. 15 and 16). Thus, the contact discs 24 and 25 are centered with respect to the axis of the driving drum 20 and all three members may be rotated as a unit.

The contact discs 24 and 25 are alike in structure and by reference to FIGS. 15 and 16 it can be seen that each disc is provided with three raised pads 27 and three cut out portions 28 around its outer periphery, also three raised pads 29 and three cut out portions 30 around its inner periphery. When the discs are placed together with the raised pad sides facing each other and the rectangular shaped openings 26 in alignment with each other, the two discs will interleave with each other, the various raised pads 27 and 29 of one disc lying within the cut out portions 28 and 30 respectively of the other disc.

Each of the contact discs 24 and 25 is provided with cross holes which extend through its raised pads 29 into which are inserted shouldered contact brushes designated 1A to 6A inclusive, the shoulder portion bearing against one face of the disc. Each of the contact discs 24 and 25 is also provided with a countersunk depression in each of its raised pads 27 to accommodate one end of a coiled biasing spring 31, which springs bear against the other face of the disc.

Figure 10:
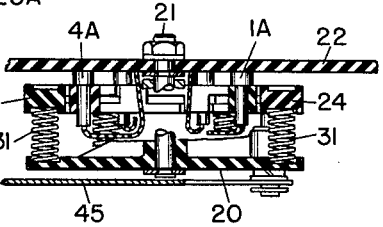
FIG. 10 is a partial sectional view of the multiple contact device apparatus shown in FIG. 7 as taken substantially on the line 10—10 of FIG. 7 looking in the direction of the arrows.

The driving drum 20 is also provided with countersunk depressions on its inner face to accommodate the other ends of the coiled biasing springs 31. With reference to FIG. 10 it can now be seen that in assembly, the biasing springs 31 are interposed under tension between the driving drum 20 and the contact discs 24 and 25, thus biasing the contact discs 24 and 25 towards the terminal board 22. This causes the contact brushes 1A to 6A inclusive to bear against the inner face of the terminal board 22.

With particular reference now to the detailed sectional views of FIGS. 15, 16, and 17, it can be seen that the manner in which the two contact discs 24 and 25 are assembled in interleaved fashion provides an arrangement wherein each contact disc may be independently mounted on the driving drum 20 and have its three contact brushes spring biased against the terminal board 22 by means of three of the tensioned coil springs 31. Thus, the double disc arrangement provides a capacity of six movable contact members which are distributed three to each disc, yet the complete assembly occupies substantially the same space as would be required were a single disc used, such disc carrying all six movable contact members. The advantage lies in the fact that each disc has only three points of bearing against the terminal board 22 which assures equalized contact pressure at all times between each individual movable contact brush and its associated stationary contacts located on the terminal board 22.

The terminal board 22 is made of an insulation material and is provided on one side (see FIG. 18) with six pairs of metallic contact pads which are suitably bonded thereon. These pairs of contact pads are located in circular fashion around the axis of the shaft pin 21 and have been designated 1B—1C to 6B—6C inclusive and are so located that the contact brush 1A cooperates with contact pads 1B and 1C, etc., as shown in FIGS. 18 and 20. Associated with each contact pad is a printed circuit wire which is suitably bonded on the terminal board 22. These wires, which have been designated 1BW, 1CW, etc. extend from their associated contact pads 1B, 1C, etc. to enlarged pads located on the outer extremity of the terminal board 22, where they are accessible for external wire connections or plug coupling as desired.

The terminal board 22 is also provided with six terminal connectors 1D to 6D inclusive, one associated with each of the contact brushes 1A to 6A inclusive for the purpose of facilitating wiring connections from the contact brushes to external sources. These terminal connectors extend through the terminal board 22 and contact printed circuit wires which are bonded thereon. These printed circuit wires (see FIG. 19) have been designated 1AW to 6AW and extend from the terminal connectors to the outer extremity of the terminal board 22. Each terminal connector is also connected to its associated contact brush by means of a flexible wire as shown in enlarged detail in FIGS. 13 and 14, wherein the wiring connections for the contact brush 1A have been shown.

The terminal connector 1D is in the form of a metal eyelet which, along with one end of the flexible wire 1DW, is passed through a hole in the terminal board 22. When the metal eyelet is crimped into position, the end of the flexible wire 1DW is clamped under the head of the eyelet and bears against the printed circuit wire 1AW, thus providing a good electrical connection thereto. The other end of the flexible wire 1DW is then passed through the opening in the eyelet where it can extend down to and into a hole provided in the inner end of the contact brush 1A. A spiral roll pin 32 (see FIG. 14) is then pressed into position into the hole in contact brush 1A and next to the end of the flexible wire 1DW so that the flexible wire 1DW is firmly held in place within the hole and makes a good electrical connection to the contact brush 1A.

With respect to the use of a flexible wire connection between the terminal connectors and their associated contact brushes, this is necessary because as previously mentioned, the contact brushes are oscillated back and forth between their associated stationary contacts. In this connection, the driving drum 20 is provided with six radial ribs 20A (see FIGS. 9 and 17) which extend upwardly from the base thereof, thus providing separate compartments for each of the flexible wires so that they are electrically insulated from each other.

With reference now to an electromagnetic means for operating the multiple contact device of this second form of the present invention, there has been shown in FIGS. 7 to 12 inclusive a two position polar structure of the tractive armature type which is capable of being energized to either one of two positions. More specifically, the electromagnetic structure comprises two L-shaped yokes 33 and 34 of soft iron (see FIG. 12) which are attached together back to back with an armature support 35 therebetween, by means of rivets or the like. This yoke structure is suitably fastened to an angle bracket 36 which in turn is fastened to the terminal board 22 by means of bolts 37 to provide a support for the electromagnetic structure.

The yoke 33 is provided with a core piece 38 on which is mounted a coil winding 39 whereas the yoke 34 is provided with a core piece 40 on which is mounted a coil winding 41, each core piece having its usual extending pole pieces. Mounted adjacent the pole pieces of the core pieces 38 and 40 is an armature 42 which is held at its middle against the armature support 35 by means of a coil spring 43. The armature 42 is provided with a cross slot 44 across its middle portion to receive the knife edge of the armature support 35 to form a pivot point for the armature. Thus, the armature is pivotally mounted with its two end portions disposed in magnetic relation with the two pole pieces of the two core pieces 38 and 40, whereby the armature may be magnetically attracted and rocked on its pivot in accordance with alternate energization of the coil windings 39 and 41.

Attached to the armature 42 and extending at right angles thereto is a lever arm 45 which cooperates at its free end with one of the drive pins 23 of the contact device. This particular drive pin 23 is provided with an extended portion 23A which is positioned within a slot 46 located in the free end of the lever arm 45 (see FIGS. 7 and 9). The lever arm is held in position on the pin by split spring washers or the like. Thus, movement of the armature 42 causes the lever arm 45 to rotate the driving drum 20 through a predetermined arc of movement, which in this particular illustration is approximately thirty-six degrees.

The lever arm 45 is provided with a spring biased overcenter device to assist the armature 42 and its associated operating means in positioning and holding the lever arm in its extreme operated positions. This overcenter device is in the form of a toggle arrangement mounted between the angle bracket 36 and a bracket 47 on the lever arm 45, a tensioned coil spring 48 providing the necessary spring bias, as more clearly shown in FIGS. 9 and 12.

The wire leads for the coil windings 39 and 41 may be suitably connected to terminal connectors C1 to C4 inclusive which are fastened to and extend through the terminal board 22 (see FIGS. 7 and 19). These terminal connectors C1 to C4 inclusive are connected to respective printed circuit wires CW1 to CW4 inclusive which are bonded on the terminal board 22 and extend to the outer extremity thereof to facilitate external wire connections to the coil windings 39 and 41.

Referring now to the operation of this form of multiple contact device and its associated electromagnetic operating means, as shown on the drawings the coil winding 39 has been energized, thus attracting the armature 42 to the pole piece of the core 38 and moving the lever arm 45 to its extreme clockwise position. With the lever arm 45 and its associated driving drum 20 in this position, the contact discs 24 and 25 are also in their extreme clockwise positions so that the various contact brushes 1A to 6A inclusive are in contact with their respective stationary contacts 1B to 6B inclusive, as shown in FIG. 18.

Assuming now that the coil winding 39 is deenergized and the coil winding 41 is energized, the armature 42 will be attracted to its other position against the pole piece of the core 40, thus shifting the lever arm 45 in a counterclockwise direction to its other extreme position. This movement of the lever arm 45 will rotate the driving drum 20 and its associated contact discs 24 and 25 in a counterclockwise direction and cause the contact brushes 1A to 6A inclusive to shift and contact their respective stationary contacts 1C to 6C inclusive as shown in FIG. 20.

In FIGS. 21 to 26 of the drawings there has been shown another type of electromagnetic means for operating the multiple contact device of this second form of the present invention. This electromagnetic operating means is a two position polar structure of the rotary type wherein a permanent magnet is employed to establish permanent poles in the armature structure whereas the poles in the core structure may be reversed in accordance with the reversal of the current passing through its associated coil winding. The multiple contact device is basically the same as that already described above, the mounting means for the driving drum and the electromagnetic structure having been modified to suit this particular structure.

Figure 13:
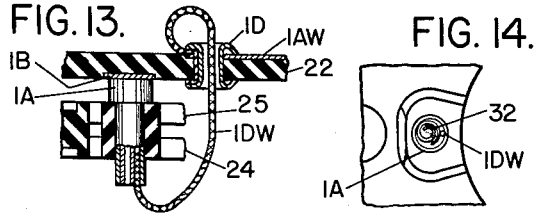
FIGS. 13 and 14 are detail views showing the manner of connecting one of the movable contact members of the multiple contact device to the printed circuit board which carries the stationary contact members.
Figure 14:
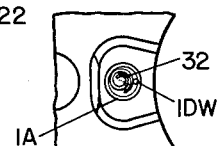

More specifically, the terminal board 49 is substantially circular in shape having an extending portion at one end to accommodate the printed circuit wiring and facilitate external wiring connections thereto. This terminal board 49 is similar to the terminal board 22 in that it is provided with six pairs of stationary contact pads 1B and 1C to 6B and 6C inclusive and six terminal connectors 1D to 6D inclusive (see FIGS. 25 and 26). Printed circuit wires 1BW, 1CW, 2BW, 2CW, 3BW and 3CW are bonded on the contact side of the terminal board 49 and are connected to their respective contact pads 1B, 1C, 2B, 2C, 3B and 3C to provide electrical connections from the contact pads to the outer extremity of the terminal board 49. Similarly, the three terminal connectors 1D, 2D and 3D are provided with printed circuit wires 1AW, 2AW and 3AW respectively. The other six contact pads 4B, 4C, 5B, 5C, 6B and 6C, also the three terminal connectors 4D, 5D and 6D are electrically connected through the terminal board 49 to its other side by means of other terminal connectors, where they are connected to the printed circuit wires 4BW, 4CW, 5BW, 5CW, 6BW, 6CW, 4AW, 5AW and 6AW respectively. The various terminal connectors 1D to 6D inclusive are electrically connected to their respective contact brushes 1A to 6A inclusive by means of flexible wires 1DW to 6DW inclusive, all as shown in FIGS. 13 and 14 and previously described.

The structure and assembly of the two interleaved contact carrying discs 24 and 25 and the method of mounting them on the driving drum 50 is exactly the same as shown in FIGS. 15, 16 and 17 and previously described. The driving drum 50 is mounted for rotation on a shaft pin 51 which is fastened into and extends from the terminal board 49. In this particular structure, the driving drum 50 not only positions and drives the two contact carrying discs 24 and 25, but also serves as a mount for the permanent magnet armature structure of the polar relay operating means, as shown in FIGS. 21, 22 and 23.

The armature structure comprises a permanent magnet PM and two iron extension pieces 52 and 53, one located at each end of the permanent magnet PM and all three pieces lying within a groove extending across the outer face of the driving drum 50. The armature extension pieces 52 and 53 are fastened to the driving drum 50 by means of rivets 54 and also pins 55 which extend therethrough and act as drive pins for the two contact carrying discs 24 and 25. These two armature extension pieces 52 and 53 are provided with downturned legs 52A and 53A respectively which cooperate magnetically with the core structure of the polar relay operating means.

The core structure is in the form of a solid mass of iron of substantial drum shape and has a hollowed out portion therein into which is placed a coil winding. In manufacture, this mass of iron is made up of two pieces 56 and 57. One of the pieces, such as 57, is provided with a hollowed out rectangular shaped groove into which is placed the coil winding 58. The two pieces 56 and 57 are then fastened together by means of rivets 59, thus forming a solid unit. The two outer sides 56A and 57A of the mass, which lie on either side of the coil winding 58, are flat and designate the two ends of the core structure. These two core ends 56A and 57A may thus be pole changed in accordance with the direction of flux flow through the core structure produced by the manner of energization of the coil winding 58.

The core structure as a whole is fastened to the terminal board 49 by means of rivets 89. A sheet of insulating material 90 is inserted between the terminal board 49 and the core structure to electrically insulate the printed wires on the terminal board 49 from the iron core structure.

The two wire leads 86 and 87 from the coil winding 58 pass through an opening 88 in the core piece 57 and are connected to the terminal connectors C5 and C6 respectively on the terminal board 49. Printed circuit wires CW5 and CW6 on the terminal board 49 are connected to the terminal connectors C5 and C6 respectively and extend to the outer edge of the terminal board to facilitate making external wiring connections to the coil winding 58.

When assembled, the driving drum 50 and its associated armature structure are held in position on the shaft pin 51 by means of a split ring washer 91 which engages a groove in the shaft pin 51. In this position, two downturned legs 52A and 53A of the armature extension pieces 52 and 53 respectively will telescope the core structure 56–57 with a small airgap therebetween. Thus, the rotatable armature structure is positioned in magnetic relationship with the core structure. Also, the two contact carrying discs 24 and 25 are engaged by the drive pins 55 and are positioned with their contact brushes 1A to 6A inclusive spring biased against the terminal board 49 by means of the biasing springs 31 as previously explained.

With reference again to the magnetic structure of this particular electromagnetic operating device just described, as shown in the drawings (FIGS. 21 to 25 inclusive), the permanent magnet PM is positioned with its north pole N next to the armature extension piece 52 and its south pole S next to the armature extension piece 53. Thus, the downturned leg portion 52A of the armature structure is permanently poled north (N) at its end whereas the leg portion 53A is poled south (S) at its end. Also, as shown on the drawings, it has been assumed that the coil winding 58 has been energized by current of a certain polarity to cause its core end 56A to be poled south (S) and its core end 57A to be poled north (N).

Under these conditions, the leg portion 52A of the armature structure has been attracted towards the end portion 56A of the core unit whereas the leg portion 53A of the armature structure has been attracted towards the end portion 57A of the core unit. This rotary movement of the armature and its associated driving drum 50 has caused the contact brushes 1A to 6A inclusive of the contact carrying drums 24 and 25 to make contact with their respective contact pads 1B to 6B inclusive located on the terminal board 49, as shown in FIG. 25.

In this connection, it should be understood that the amount of rotary movement from one contact position to the other contact position of the multiple contact device has been assumed to be approximately thirty-six degrees. Thus, the rotary movement of the armature assembly must be limited to thirty-six degrees. This has been accomplished by providing ledges 92 and 93 on the sides of the terminal board 49. As shown on the drawings, the armature leg portion 53A is bearing against the ledge 92 in the present contact position of the device, thus providing a limiting stop for movement of the armature in that particular direction.

The multiple contact device may be operated to its other contact position merely by reversing the energizing current through the coil winding 58. This action would reverse the flow of flux through the core structure and cause the core end 56A to be poled north (N) and the core end 57A to be poled south (S). Thus, with like poles repelling and opposite poles attracting, the armature assembly would rotate in an opposite direction until the leg portion 52A came into contact with the stop ledge 93. In this position, the contact brushes 1A to 6A inclusive would be in contact with their respective contact pads 1C to 6C inclusive.

From the above description and with reference to the drawings, it can be seen and understood that in both of the forms of the multiple contact device shown and described, each of the contact carrying discs is individually suspended, centered and biased against its associated stationary contact elements and has three points of bearing surface therebetween. This three point bearing means between the rotary contact element and the stationary contact element assures an even contact pressure at all times regardless of the rotary movement of one of the elements. The pre-tensioned biasing springs maintain constant pressure between the two contacting elements so that no adjustments are necessary.

It should also be noted that the feature of combining two interleaved discs permits a complement of six individual contact members within an area of space ordinarily occupied by one disc, yet each disc maintains its own three point contact bearing feature the same as it would if used individually. It should be understood that only one disc need be used to satisfy a complement of three individual contact members. Also, certain of the contact brushes may be disconnected electrically if desired, but they should be retained in the device to provide the necessary three points of bearing for each disc.

Having shown and described two forms which the multiple contact device of the present invention can assume and typical modes of operation therefor, it should be understood that various adaptations and deviations could be made thereto, all without departing from the spirit of the invention within the scope of the appending claims.

What I claim is:

1. A multiple contact device comprising, in combination, a plurality of terminals mounted for electrically communicating with an externally disposed electrical means, a first contact element stationarily mounted and having a plurality of contacts electrically connected individually to one of said terminals, an external control means adapted to be actuated to a plurality of controlling conditions, a rotatable member operatively connected to said external control means for causing said member to be rotated to a distinctive position when said means is actuated to each of said plurality of controlling conditions, a second contact element having two insulated discs which are supported by said rotatable member and simultaneously rotatable therewith, each of said discs having electrical connections supported by one surface thereof which are biased toward said first contact element and electrically engageable with particular ones of said plurality of contacts in each of said distinctive positions 2. A multiple contact device comprising, in combination, a plurality of terminals mounted for electrically communicating with an externally disposed electrical means, a first contact element stationarily mounted and having a plurality of projecting contacts electrically connected individually to one of said terminals, said plurality of contacts being disposed on said element in two groups of three contacts, an external control means adapted to be actuated to a plurality of controlling conditions, a rotatable member operatively connected to said external control means for causing said member to be rotated to a distinctive position when said means is actuated to each of said plurality of controlling conditions, a second contact element having two insulated discs which are supported by said rotatable member and simultaneously rotatable therewith, each of said discs having metallic segments interconnected electrically and supported by one surface thereof which are spring biased toward said first contact element and electrically engageable with particular ones of said plurality of contacts in each of said distinctive positions, the metallic segments of one of said discs being always associated with one group of three contacts while the metallic segments of the other of said discs being always associated with the other group of three contacts.

3. The multiple contact device according to claim 2, wherein one of said insulated discs is positioned within an opening in the other of said insulated discs with both being supported by said rotatable member concentrically and in the same plane, said one disc having one metallic segment formed in a completed ring for engaging one of said projecting contacts continuously, other metallic segments supported by said insulated discs being electrically connected to said one metallic segment continuously so as to complete an external circuit through said one projecting contact and at least one of said other projecting contacts in each of said distinctive positions.

4. The multiple contact device according to claim 3, wherein the two groups of three projecting contacts are arranged and supported on said first contact element so as to bear against the metallic segments and insulation included with said two insulated discs to the extent that at least one of said projecting contacts in one of said two groups engage metallic segments disposed on their associated disc for each said distinctive position while the other contacts in the other of said two groups of three projecting contacts including said one projecting contact engage metallic segments disposed on their associated disc to the extent that said one projecing contact and one other projecting contact engage metallic segments in each of said distinctive positions, whereby a different combination of said projecting contacts engages metallic segments in each of said distinctive positions.

5. A multiple contact device comprising, in combination, a plurality of terminals mounted for electrically communicating with an externally disposed electrical means, a first contact element stationarily mounted and having a plurality of contact pads electrically connected individually to one of said terminals, an external control means adapted to be energized to each of two controlling conditions, a rotatable member mounted on a shaft adjacent to said first contact element and operatively connected to said external control means for causing said member to be rotated to a distinctive position as said means is energized to one of said two controlling conditions, a second contact element having two insulated discs which are supported by said rotatable member and simultaneously rotatable therewith, each of said discs having a plurality of contact brushes supported by one surface thereof which are biased toward said first contact element and electrically engageable with particular ones of said plurality of contact pads in each of said two distinctive positions.

6. The multiple contact device according to claim 5, wherein said external control means is a relay of the polar type having a tractive armature pivotally mounted, a core structure and coil windings mounted on said core structure, said coil windings being effective when energized by a current of one polarity to operate said armature to a corresponding position and when energized by a current of the opposite polarity to operate said armature to a corresponding position, said armature being operatively connected to said rotatable member so as to cause rotation thereof through a predetermined arc of movement.

7. The multiple contact device according to claim 6, wherein said predetermined arc of movement is approximately thirty-six degrees.

8. The multiple contact device according to claim 6, wherein said plurality of contact brushes for each of said discs are positioned within the same circular arrangement when said discs are supported by said rotatable member, said plurality of contact pads are supported on said first contact element in pairs in a similar circular arrangement so as to permit each of said contact brushes to be in electrical engagement with one of said contact pads of an associated pair for one of said two distinctive positions and in electrical engagement with the other of said contact pads of such associated pair for the other of said two distinctive positions.

9. A multiple contact device comprising, in combination, a plurality of terminals mounted for electrically communicating with an externally disposed electrical means, a first contact element stationarily mounted and having a plurality of contact pads electrically connected individually to one of said terminals, an electromagnetic means having a core member with a coil winding thereon and two opposite poles capable of being pole changed according to the polarity of energization of said coil winding, a rotatable member operatively connected to said electromagnetic means and having a permanent magnet armature mounted thereon so as to have its polarized end portions disposed in magnetic relationship to the pole ends of said core member, said armature being effective to rotate said member to either one of two distinctive positions, a second contact element having two insulated discs which are supported by said rotatable member and simultaneously rotatable therewith, each of said discs having a plurality of contact brushes supported by one surface thereof which are biased toward said first contact element and electrically engageable with particular ones of said plurality of contact pads in each of said two distinctive positions.

10. The multiple contact device according to claim 9, wherein said first contact element is mounted on an included terminal board which has a shaft secured threto and extending therefrom, said rotatable member being mounted and rotatable on said shaft, said permanent magnet armature also being mounted on said shaft and secured to said rotatable member so as to cause simultaneous rotation thereof, said opposite poles being secured to the opposite side of said terminal board, said permanent magnet armature having extensions therefor so as to cooperate magnetically with said opposite poles according to the polarity established in said core member.

11. The multiple contact device according to claim 10, wherein said terminal board includes stop members formed therewith for limiting the movement of said permanent magnet armature extensions from one of said two distinctive positions to the other of said two distinctive positions to approximately thirty-six degrees.

References Cited in the file of this patent

UNITED STATES PATENTS

| | | |
|---|---|---|
| 2,060,951 | Rae et al. | Nov. 17, 1936 |
| 2,433,888 | Brownlee | Jan. 6, 1948 |
| 2,792,460 | Bleeze | May 14, 1957 |